April 15, 1952   G. A. WALDIE ET AL   2,592,770
VARIABLE-OSCILLATOR CONTROLLED RELAY SYSTEM
Filed Feb. 8, 1947   2 SHEETS—SHEET 1
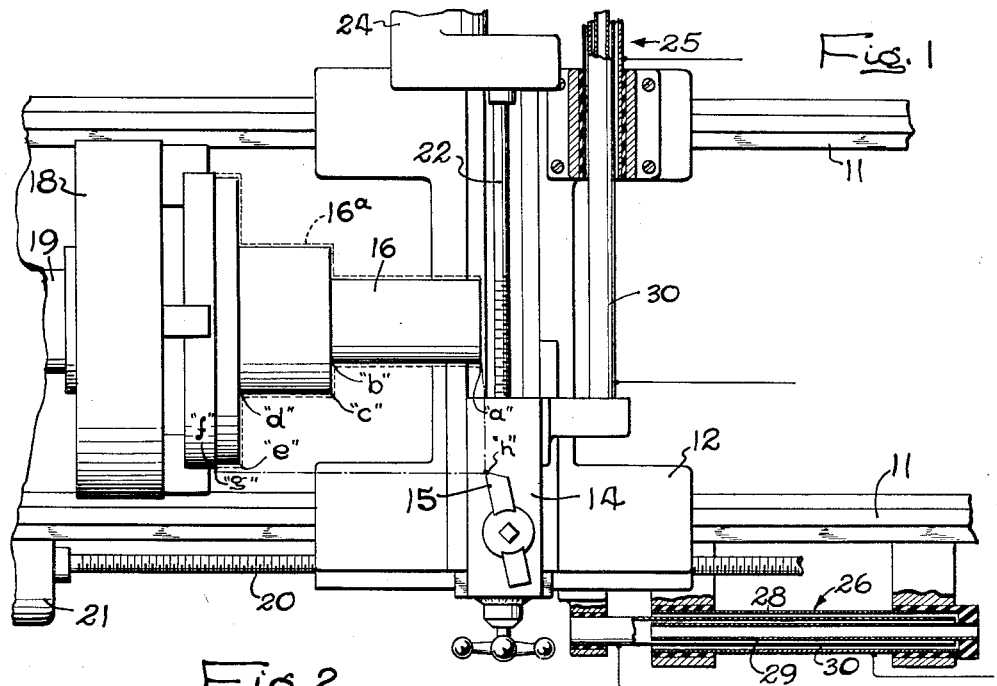
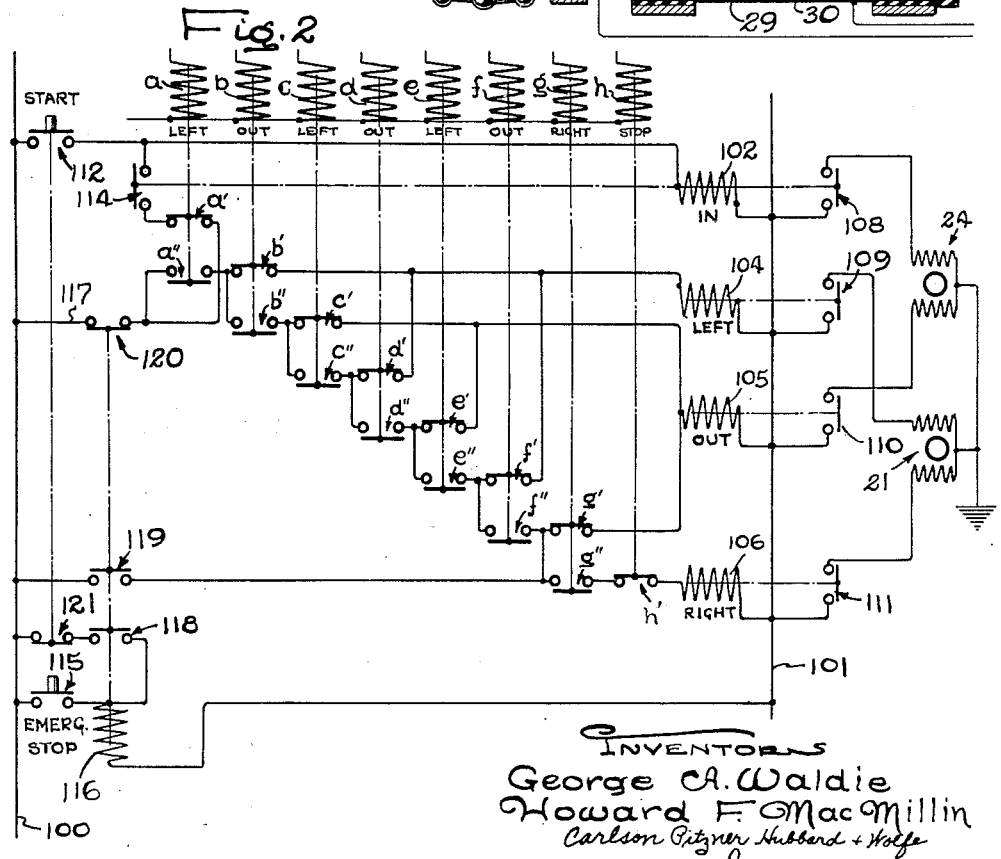

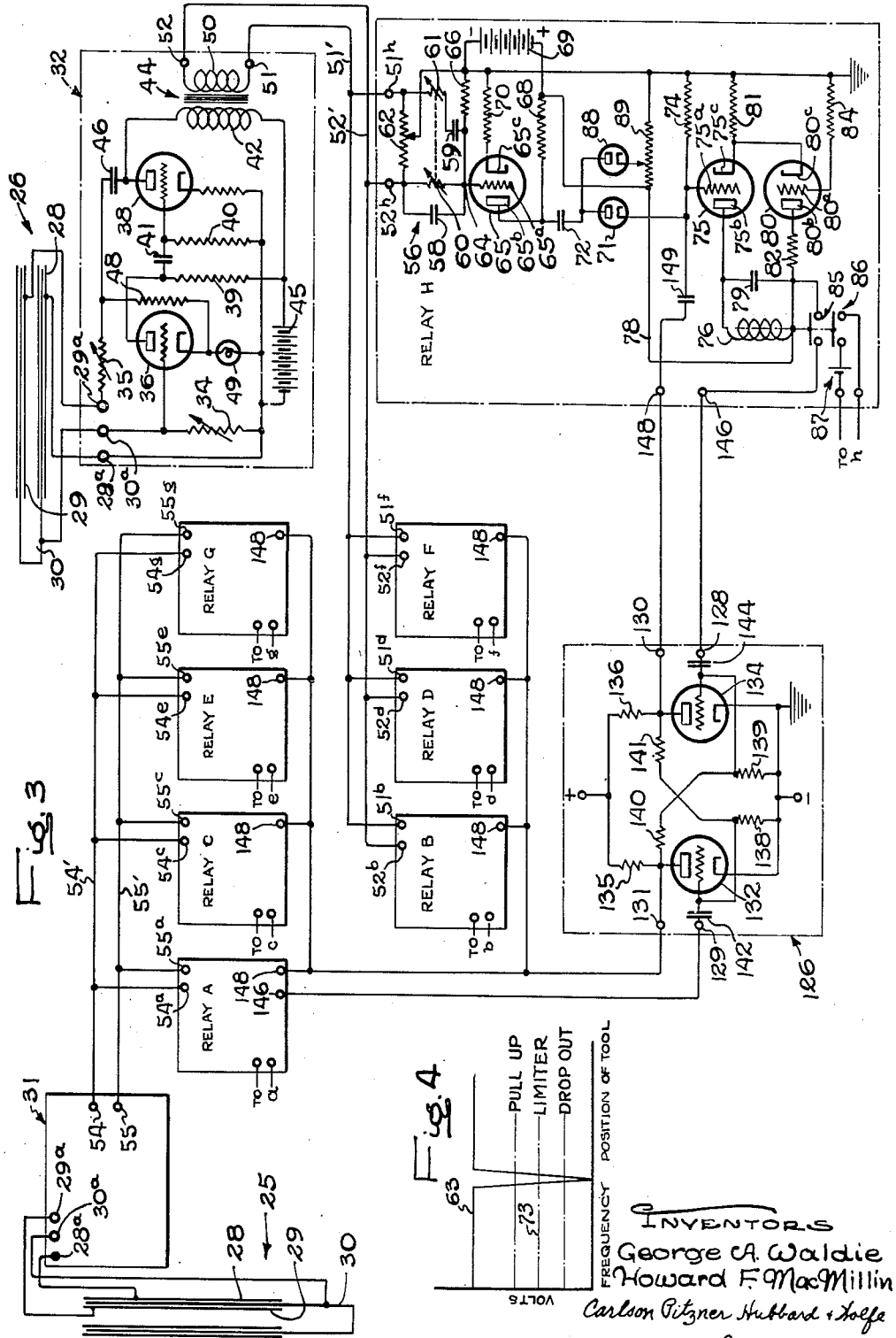

Patented Apr. 15, 1952

2,592,770

UNITED STATES PATENT OFFICE 2,592,770

VARIABLE-OSCILLATOR CONTROLLED RELAY SYSTEM

George A. Waldie, Worthington, Ohio, and Howard F. MacMillin, Wilmette, Ill., assignors to MacMillin Engineering Corporation, a corporation of Illinois Application February 8, 1947, Serial No. 727,460

16 Claims. (Cl. 175—320)

The present invention relates to position responsive control devices and more particularly to devices for controlling one or more functions in response to the positioning of a control member.

In the field of industrial control it is frequently found desirable to initiate a number of functions successively in response to the positioning of a control member which may be located remotely. In some instances the control member may be merely a manual lever or the like settable to a selected one of a number of detented positions. In other applications the control member may be infinitely variable and it may be essential that a particular function be performed as an incident to the control members being positioned accurately to within, say, a few thousandths of an inch of some predetermined point.

An example of the latter requirement is to be found in machine tool practice where the movement of a contouring tool through a predetermined displacement in one direction may be utilized to initiate a successive movement of the tool in another direction along the workpiece. A further example occurs in connection with hydraulic presses where movement of the press head through a predetermined displacement may be employed to effect a change in the speed of advancement. In these and similar applications it has been common practice to use mechanical linkage to couple the movable control member with the responding switches, hydraulic valves or the like. However, in cases where accurate remote response is required, mechanical linkage has been found to be unsatisfactory. In the first place, it is extremely difficult to construct a mechanical linkage without lost motion or "play." If the linkage contains several joints, the play in each of such joints results in an appreciable cumulative error. In the case of fast moving control linkages, the inertia of the mechanical parts may cause additional error. Furthermore, the use of conventional position responsive devices such as limit switches for initiating consecutive functions is disadvantageous since such devices occupy appreciable space along the bed of the machine which not only interferes with the operation thereof but also incurs the danger of accidental bumping and consequent misadjustment. Conventional devices for programming a sequence of machine operations are also relatively inflexible, changes of setup being both difficult and time consuming.

In the course of producing improved position responsive controls for a machine tool or the like, we have observed that a satisfactory control link should enable the accurate establishment of a large number of control points and should be readily susceptible of adjustment so that the controlled machine may be adapted for a completely different work setup in a few minutes' time. Once adjusted, the control should retain calibration in spite of the hard usage to which machine tools, presses, and other production machinery are subject.

It is a primary object of the present invention, therefore, to provide a control linkage in which the function to be controlled is initiated upon advancement of the control member to an exactly predetermined point and in which the point of response may be quickly and easily changed. It is a related object to provide a control system in which many functions may be initiated in exactly predetermined sequence in response to small increments of movement of the control member.

It is another object of the present invention to provide a control linkage particularly well adapted for the remote control of a plurality of functions, the accuracy of calibration of the control member being substantially unaffected by the physical separation between such member and the responsive device and independent of the number of responsive devices being used.

It is a further object of the present invention to provide a control device responsive to the arrival of a moving machine member at predetermined points in the path of movement of the latter and without imposing any mechanical loading thereon, and in which the desired points of response may be adjusted remotely from the machine member.

It is a more detailed object of the invention to provide an improved frequency responsive control device including a network having the notched frequency response characteristic of a Wien bridge for causing operation of an associated electromagnetic relay at a predetermined frequency and which includes provision for preventing resetting of such relay upon subsequent departure of the frequency from the predetermined value.

In one of its aspects it is an object to provide a control system for a moving machine member including an oscillator controlled by the positioning of the machine member and a plurality of sequentially tripped receiving devices in which the tripping of one of the receiving devices is utilized to reset certain remaining ones of such devices in readiness for a succeeding cycle of the machine member and to insure that tripping takes place in the proper sequence.

In a more detailed aspect the present invention provides an improved control for a contouring machine tool in which relative movement of the cutting tool in one direction through an accurately predetermined distance is effective to initiate subsequent movement of the tool in another direction thus eliminating the necessity for a control template.

It is still another object of the invention to provide an improved control system for a plurality of functions such as the successive movements of a machine member which is "fail-safe" upon failure of an electrical component or source of electrical power.

Other objects and advantages of the invention will become apparent from the following detailed description taken in connection with the accompanying drawings, in which:

Figure 1 is a fragmentary plan view of a contouring type of machine tool employing improved control system.

Fig. 2 shows the contactor arrangement used in the controlling of the feed and traverse motors.

Fig. 3 is a schematic diagram partially in block form of the electronic portion of the control system.

Fig. 4 is a simplified showing of the notched frequency response characteristic of the various signal receiving devices employed in the control system.

While the invention is susceptible of various modifications and alternative constructions and uses, we have shown in the drawings and will herein describe in detail but one embodiment of the invention. It is to be understood, however, that we do not intend to limit the invention by such disclosure, but aim to cover all modifications and alternative constructions and uses falling within the spirit and scope of the invention as expressed in the appended claims.

In its simplest form our improved control system includes a variable frequency transmitter and a remotely located receiving device terminating in an electromagnetic relay or similar device. A movable control member is attached to the transmitter to control its frequency, and movement of such control member to a predetermined point in its path of travel causes the transmitter to produce a signal of a frequency to which the receiving device is responsive, resulting in operation of the relay or similar load device upon the arrival of the control member at the predetermined point in its path of movement.

The invention is by no means restricted to this concept, however, but in addition includes a number of important features contributing markedly to the range and accuracy of the control, adapting it particularly to the controlling of a movable machine member such as a metal removing tool. In accordance with one aspect of the invention a single transmitter is used in conjunction with a plurality of frequency responsive receiving devices, an interlocking relay circuit of improved design being provided to cause the receiving devices to initiate a predetermined series or program of machining operations. In order that the capabilities of the basic transmitting-receiving system may be appreciated, the invention will be discussed with particular reference to a contouring machine tool. It will be understood, however, that such usage is representative only and that our teachings could, by one skilled in the art, be readily employed to control any desired function or plurality of functions in response to the accurate positioning of a control member. Although in the present instance the condition being controlled is the direction of tool movement, other conditions such as the speed of advancement or speed of rotation are similarly subject to control.

While all portions of the improved device contribute to the final result, nevertheless for purposes of convenience the device disclosed may be broken down into a number of sub-combinations. These include the machine tool itself with a pair of coordinate position detectors thereon, the transmitters, the receiving devices, the motor control circuit and the means for resetting the receiving devices upon completion of a machining cycle.

*Machine tool*

The representative machine tool to which the control system is applicable is disclosed in Fig. 1. Here it will be noted that the machine tool indicated generally at 10 includes ways 11 and a saddle 12 slidably traversing the same. The saddle has mounted thereon a cross slide 14 carrying a metal removing tool 15 to advance the same into machining engagement with a rotatable workpiece 16. The latter may be mounted between centers or may be clamped in a rotating chuck 18 mounted on a power driven shaft 19. Relative traversing movement between the tool 15 and the workpiece 16 is produced by a lead screw 20 rotated by a suitable driving motor 21. Feeding movement, on the other hand, is effected by a feed screw 22 driven at a suitable speed by a more or less conventional feed motor 24.

It will be assumed that the workpiece 16 is supplied in the form of a forging or the like having an original outline 16a shown dotted. It will be assumed further that such workpiece must be machined accurately to the outline indicated by the points or positions "a," "b," "c," "d," "e," and "f" by an automatic control arrangement. In accomplishing this and in accordance with one aspect of the invention, the tool 15 is fed inwardly to point "a," and, upon reaching the latter point, is caused automatically to execute a traversing movement until point "b" is reached at which time the tool is automatically withdrawn until it reaches point "c," after which the tool moves to point "d" and thence to the completion of the desired contour of the finished workpiece. By application of our teachings, the change in direction of movement of the tool is caused to occur as an incident to the tool reaching a predetermined coordinate point (point "a," for example) within a few thousandths of an inch of an exactly predetermined position.

In accordance with one feature of the invention, variable capacitors are provided which are adjusted in unison with the positioning of the tool 15 in feed and traverse respectively. Such capacitors, herein indicated at 25 and 26 respectively, are preferably of the telescoping tubular type, capacitor 26 including a stationary outer electrode 28, a stationary inner electrode 29, and an intermediate electrode 30 inserted coaxially between them. Such intermediate electrode is rigidly fixed to the saddle 12 and is thus at all times responsive to the positioning of the tool 15 in the direction of traverse. Similarly, the intermediate element 30 of the feed capacitor 25 is fastened to the cross slide 14 so that the capacitor 25 may serve as a measure of the advancement of the tool 15 in the feed direction. The electrodes 28, 29, and 30 of both of the capacitors are effectively insulated from conducting portions of the machine tool by appropriate insulating sleeves. If desired, insulating spacers may be used within the capacitors 25, 26 to keep the intermediate electrodes 30 accurately centered despite their length.

Position transmitter

In keeping with one of the principal objects of the invention means are provided whereby the relative positioning of the tool in feed and traverse is utilized to control the frequency of a transmitted signal. Turning now to Fig. 3 it will be seen that the variable capacitors 25, 26 are connected to the respective input circuits of position transmitters 31, 32 respectively which include a variable frequency oscillator. Such oscillator is preferably of the resistance-capacity or RC type.

The specific details of the transmitter 32 are shown in the upper righthand portion of Fig. 3 where it will be seen that the capacitor 26, which has two simultaneously varied sections, is connected to the input network of the transmitter by means of leads connected to terminals 28a, 29a, and 30a respectively.

The two sections of the capacitor 26 are in adjacent legs of a bridge circuit, one of such sections having a variable resistor 34 in parallel therewith while the other section has a second variable resistor 35 in series. The circuit is thus seen to be of the Wien type having a notched output characteristic. That is to say, a given setting of the capacitor 26 will produce a zero voltage at the bridge output terminal 30a. The output signal of the Wien bridge is amplified by any suitable valve here shown as a triode 36. The output signal from the triode 36 is fed into a second stage of amplification which may, for example, include a triode 38, coupling being effected through resistors 39, 40 and capacitor 41. The plate circuit of the triode 38 is completed through a primary 42 of an output transformer 44. A battery 45 or other source of potential supplies the plates of both of the triodes 36, 38.

It will be noted that a portion of the output signal of the triode 38 is fed back, via a coupling capacitor 46, into the input circuit of the triode 36 through two separate paths. One of the paths includes the variable resistor 35 in the Wien bridge circuit while the other path includes resistors 48, 49 forming a voltage divider the center point of which supplies the cathode of the first triode 36. When the resistances 34, 35 are equal and when the two sections of the capacitor 26 have equal capacitance, feedback is a maximum and the phase shift is zero for the frequency $$f = \frac{1}{2\pi RC}$$

Thus, for a given value of bridge resistance and capacitance, feedback or oscillation occurs at a single frequency $f$, and all other frequencies are degenerated.

The wave shape of this type of RC oscillator has been found to be extremely favorable, particularly with the resistor 48 adjusted so that the gain of the amplifier is just sufficient to support oscillation. Amplitude stability under all frequency conditions may be obtained by employing a conventional lamp for the resistor 49, such lamp being of the type wherein filament resistance varies with current flow therethrough. In operation, any increase in current through the lamp increases its resistance and thereby increases the inverse feedback, decreasing the overall gain and restoring the original amplitude of the output signal.

In an oscillator of this type the frequency generated is inversely proportional to the tuning capacity instead of inversely proportional to the square root of the tuning capacity as in ordinary oscillators. A particularly advantageous feature of the circuit is the fact that the output remains substantially constant over enormous frequency ranges. The transmitted signal produced at the secondary winding 50 of the output transformer 44 thus varies in exact accordance with the positioning of the intermediate electrode of the capacitor 26 in spite of a large range of tool movement. In practice, it has been found that moving the intermediate electrode 30 of the capacitor 26 even as little as a few thousandths of an inch anywhere in its path of movement produces a substantial and proportional change in the frequency of the transmitted signal.

While only the transmitter 32 associated with the position of the tool in traverse has been discussed in detail, it will be understood that the "feed" transmitter 31 is similar to transmitter 32 in every respect, and in both cases the transmitted signal is fed into a series of frequency responsive devices or relays. In the case of the transmitter 32, the output terminals have been designated 51, 52 while corresponding terminals on the remaining transmitter are designated 54, 55.

Frequency responsive relays

As disclosed in Fig. 3, the transmitters or signal generators 31, 32 are coupled to the input terminals of a plurality of frequency responsive devices which, taken together, will be referred to as relays A to H inclusive. If desired, such coupling may be effected via relatively lengthy transmission lines 51', 52', 54', and 55'. While the cooperation of various ones of the relays A to H is important to certain aspects of the applicants' invention, several of the more basic features will be described solely in connection with relay H as set forth in the lower righthand portion of Fig. 3.

The input terminals of relay H have been designated 51h, and 52h and are connected to the correspondingly numbered transmission lines. From the input terminals the alternating voltage derived from the transmitter 32 is applied to a frequency responsive network 56. In accordance with one aspect of the invention, the network 56 is so constructed of resistive and capacitive components that a signal of minimum amplitude is produced at the output terminals thereof when the input signal is at a predetermined frequency. In the present instance the network 56 forms a Wien bridge including capacitors 58, 59 and resistors 60, 61 and having an output terminal 64. As in the case of the Wien bridge previously discussed, the resistors and capacitors are constructed so as to have equal impedances respectively. Any slight discrepancy is compensated for and maximum response obtained by means of a potentiometer 62 connected across the input terminals 51h, 52h.

The particular input frequency for which the bridge 56 is adjusted may, for the sake of convenience, be termed the critical frequency. At such frequency the voltages produced across adjacent legs of the Wien bridge are in opposition and zero signal is applied to the bridge output terminal 64; however, for all other frequencies an appreciable signal voltage will be applied to the output terminal. Since the signal at the output terminal 64 of the bridge drops off sharply as the critical frequency is achieved, the voltage-frequency curve may be thought of as having a notched configuration. In order to increase the sharpness of the notch, approximately as shown at 63 in Fig. 4, and therefore to increase the accuracy of frequency response, an amplifier is used which may, for example, consist of a triode 65 having a grid 65a, a plate 65b, and a cathode 65c. The grid circuit includes a grid resistor 66 while the plate circuit is fed through a plate resistor 68 from a suitable high voltage source 69. The triode is biased by means of a resistor 70 included in series with the cathode 65c.

From the plate of the amplifier tube 65 an amplified signal is fed into a rectifier 71, coupling to the plate of the rectifier being obtained by a coupling capacitor 72. The circuit of the cathode of the rectifier 71 is completed through a resistor 74 to ground. During normal operation, the anode of the rectifier 71 is excited by an alternating voltage wave, a positive potential on the anode acting, in a well known manner, to draw current through the rectifier series resistor 74 and thus to produce a pulsating voltage across the same.

In order to convert the unidirectional voltage pulses across resistor 74 into current pulses of sufficient magnitude to control an electromagnetic relay, an output valve 75 is used having a grid 75a, a plate 75b, and a cathode 75c. As shown, the grid 75a is connected to the "floating" end of the rectifier resistor 74, thus supplying the grid with a series of positive pulses. In series with the plate 75b of the output tube is an electromagnetic relay 76 which is connected through a lead 78 to the positive side of the voltage source 69. Shunted across the winding of the electromagnetic relay 76 is a capacitor 79 of sufficient storage capacity to level out the current pulses to a more constant average value.

To prevent current from flowing through the electromagnetic relay 76 under conditions of zero input signal (corresponding to the condition of critical frequency), the output valve 75 is provided with a source of negative bias which is substantially independent of the current flowing through the cathode-plate circuit of the valve. In the present instance such fixed bias is provided by an auxiliary biasing triode 80 having a grid 80a, a plate 80b, and a cathode 80c. The cathode 80c is connected directly to the cathode 75c of the output valve, both of such cathodes being grounded through a common cathode resistor 81. A positive voltage is supplied to the plate 80b of the auxiliary triode through a plate dropping resistor 82 which is connected to the high voltage lead 78 previously referred to. The grid 80a may be grounded through any suitable high resistance 84.

The function of the auxiliary biasing triode 80 may be readily understood by considering the voltage drop in the cathode resistor 81 under conditions of zero input signal and maximum input signal respectively. Assuming first that the signal applied to the grid 75a of the output valve is zero, there is little or no tendency for the output valve 75 to pass current. The latter is particularly true since the auxiliary triode 80 under such conditions passes sufficient current through the common cathode resistor 81 to bias the output valve 75 to cutoff. The latter is a stable condition which exists as long as the frequency of the input signal to the device H as a whole is at the critical value. Upon a variation in the frequency either upwardly or downwardly from the critical value, positive voltage pulses will be applied to the grid 75a of the output valve 75 causing current to flow through the electromagnetic relay 76, and, of course, through the common cathode resistor 81. This additional current through the resistor 81 tends to increase the voltage drop therethrough and tends therefore to increase the negative bias on the auxiliary triode 80. Any additional bias on the auxilary triode decreases the current flowing therethrough, and thus the voltage drop through the resistor 81, until normal bias for the valve 75 is restored. Conversely, any loss of signal to the output valve 75 causes a decrease in the common cathode bias which increases the current through the auxiliary triode. As a result, and regardless of the magnitude of input signal to the valve 75, the bias thereon remains substantially constant. The severe degenerative effect which would occur in the absence of the auxiliary triode is avoided, and the sensitivity of the output valve is therefore a maximum under all conditions.

It will be helpful at this point to review the operation of the circuit thus far described. Upon advancement of the tool 15 along the bed of the machine, the capacitance 26 and the frequency of the output signal of the transmitter 32 will be varied accordingly. Initially, then, the frequency applied to the input terminals of the receiving device will be on one side or the other of the critical value. Under such conditions the bridge 56 will produce a signal which, amplified by the triode 65 and rectified by the rectifier 71, is applied to the grid of the output tube 75 as a series of positive pulses, producing a flow of current in the electromagnetic relay 76 in the plate circuit thereof. Using the circuit shown, it is contemplated that the relay 76 will normally be in the "picked up" condition. However, as the applied frequency reaches the critical value, the output of the bridge 56 becomes zero and zero signal is applied to the grid of the output valve 75. The relay 76 is therefore caused to drop out and, in so doing, closes normally open contacts 85, 86 associated therewith.

It might be expected, as additional movement is imparted to the control capacitor 26 resulting in a re-established voltage at the output of the Wien bridge, that positive voltage would again be applied to the output valve 75 resulting in the picking up of the electromagnetic relay 76. It is desirable, however, for a reason which will later appear, to prevent the relay 76 from picking up after it has once dropped out and upon continued movement of the control capacitor 26. To this end, means are included in the circuit for limiting the maximum signal to a valve 73 (see Fig. 4) which is below that required to pick up the relay 76. In the present instance such limiter is interposed between the amplifier triode 65 and the output valve 75 and takes the form of a diode 88. As shown, the plate of such diode is connected directly to the plate of the rectifier 71 while the cathode is connected to the slider of a potentiometer 89 which is shunted across the high potential source 69.

The manner in which the limiter 88 acts to reduce the signal magnitude will be apparent by considering the effect of a large positive voltage swing at the plate 65b of the amplifier. A large positive-going voltage at this point, acting through the capacitor 72, will cause a corresponding positive swing of the plate within the limiter 88. The latter will produce a large flow of current through the limiter, which current must flow through the plate resistor 68 which it shares in common with the amplifier triode 65. Such increased current through the resistor 68, increasing the voltage drop therein, reduces the positive swing of the voltage at the plate 65b and thus tends to reduce the current through the limiter. In short, the effect of the limiter is to reduce the extent of positive swing of the plate 65b of the triode 65 thereby reducing to a predetermined magnitude the maximum signal which may be applied to the grid of the output valve 75. Such signal may be limited to a value below that required for picking up the electromagnetic relay 76 merely by adjustment of the slider on the potentiometer 89, the latter controlling the point at which limiting action is initiated.

In the preceding discussion detailed reference has been made to but a single transmitter 32 and a single receiving device, the relay H, and it will be appreciated that such combination per se may be utilized to accomplish many useful control functions. For example, relay H may be employed as a remotely tripped limit switch since the contacts 85, 86 are actuated immediately as incident to the movable electrode 30 within the capacitor 26 reaching a predetermined point in its path of movement. The particular point at which such response occurs may be easily and quickly adjusted to a new accurately determined position merely by simultaneous adjustment of the Wien bridge resistors 60, 61 which may be ganged for purposes of convenience.

Our invention contemplates, however, in one of its aspects that a single transmitter be used to control a number of receiving devices, in the present instance relays B, D, F, and H. Since the relays B, D and F are similar to the relay H previously discussed, it will be apparent that such series of relays may be employed to control sequentially a number of functions, each of such functions being initiated as the capacitor 26 is moved to respective predetermined positions in its path of movement.

In a similar manner the transmitter 31, which is controlled by the adjustment of the "feed" capacitor 25, may be used to actuate a series of receiving devices designated as relays A, C, E, and G. As in the case of the transmitter 32, such relays are remotely connected to the transmitter 31 by a pair of transmission lines 54', 55' leading to correspondingly designated terminals on the receiving devices A, C, E and G.

Similarly to relay H, each of the relays A, through G includes a pair of contacts 86 operated by an electromagnetic relay and arranged to be closed when the frequency of the signal applied to the input terminals reaches the value for which the particular relay has been adjusted to respond; in other words, its critical frequency. In order that closure of such contacts may be employed to energize the winding of a motor controlling relay, each set of contacts is here provided with a source of voltage, for example, a battery 87. It will be apparent, however, that a common voltage source for all of the relays may be used if desired. In the case of the relays the output terminals, which have been labeled "to a," "to b," etc., lead to correspondingly designated motor control relays to be next discussed.

*Motor control circuit*

Reference will now be made to Fig. 2 which discloses a control circuit for enabling the frequency responsive relays A to H to control the traverse motor 21 and the feed motor 24 of the machine tool disclosed in Fig. 1. While the motor control circuit disclosed in Fig. 2 contains a number of advantageous features which will be appreciated as the discussion proceeds, it is important to note that such circuit is merely exemplary of motor controlling arrangements which may be used without departing from our basic teachings.

Turning now to the matter of specific detail, it will be noted that Fig. 2 constitutes an "across the line" diagram, the voltage supply lines in this instance being indicated at 100 and 101, and connected to any suitable voltage source. In the upper portion of the diagram a series of electromagnetic relays will be noted which have been designated $a$, $b$, $c$, $d$, $e$, $f$, $g$, and $h$. Such relays form the input portion of the motor control circuit and are energized respectively by the contacts 86 contained within the correspondingly lettered receiving devices shown in Fig. 3. The output portion of the circuit, which is at the righthand side of the diagram, includes a series of four field energizing contactors, 102, 104, 105 and 106. Such contactors, it will be noted, control associated contacts 108, 109, 110 and 111, which control the four directions of movement of the tool, namely, "in," "left," "out," and "right." In accordance with our teachings, sequential operation of the input relays $a$ to $h$, as the tool moves along the workpiece from one predetermined point to another, is caused to sequentially energize the individual ones of the field windings of the feed and traverse motors 24, 21, thereby defining a predetermined program of feeding and traversing movements required to produce the finished contour. In addition, the motor control circuit includes a number of ancillary features contributing to safe fool-proof operation and to which detailed reference will be made.

It will be noted in Fig. 2 that each of the motor controlling relays $a$ to $g$ includes a set of normally closed contacts which are indicated by the corresponding primed reference characters and a set of normally open contacts which are indicated by doubly primed reference characters. In general, the function of the normally open contacts is to initate one of the functions in the sequence, while the purpose of the normally closed contacts is to open-circuit the contactors controlling functions previously performed. The normally closed contacts therefore act as interlocks, insuring that all functions are performed singly and in the desired order. In the present instance the normally open contacts $a''$ to $g''$ are connected to selected ones of the contactors 102, 104, 105, and 106, the order of association depending upon the nature of the contour to be cut into the workpiece. For the sake of simplicity it will be assumed that the workpiece 16 (see Fig. 1) is to be cut with a series of traversing and outwardly feeding movements of the tool 15 to produce a series of steps. To accomplish this it is necessary that the "left" contactor 104 and the "out" contactor 105 be energized alternately. Thus it will be seen that contacts $a''$ supply power to the "left" contactor 104 after which contacts $b''$ of relay $b$ supply power to the "out" relay 105. Simultaneously with the latter, the contacts $b'$ open the circuit to the previously energized "left" contactor 104. Moving on to the next relay, c, it will be noted that the contacts c'' serve to re-energize the "left" contactor while contacts c' remove voltage from the previously energized "out" contactor 105. Subsequent operation of motor control relay d, acting through contacts d'', energizes the "out" contactor 105, while deenergizing the "left" contactor 104. The contacts e'' on relay e are wired so as to apply voltage to the "left" contactor 104, after which the contacts g'' apply voltage to the "right" contactor 106. Finally, contacts h' of motor control relay h open circuit contactor 106 to open contacts 111, thereby deenergizing the "right" field winding of the traverse motor 21.

In order to initiate sequential energization of the contactors, a push button 112 is used which is placed in series with the "in" contactor 102. Such push button is of the non-maintaining type, and consequently a set of normally open sealing contacts 114, actuated by the "in" contactor, are used. The resulting inward movement of the tool 15 continues until the tool reaches the predetermined position "a" at which time relay a is operated causing the tool to move to the left in its programmed path of movement.

In accordance with one of the more detailed aspects of the invention, the control circuit includes means for causing the tool 15 to move outwardly and then to the right, returning to its initial position "h," upon pressing an emergency stop push button. In the present instance such push button is of the non-maintaining type and indicated at 115. In series with the contacts thereof is the winding of an emergency stop relay 116 which controls two sets of normally open contacts 118 and 119 and a set of normally closed contacts 120. Contacts 118 are used merely for sealing purposes. Contacts 120, it will be noted, are in series with the lead 117 which supplies the "in" contactor 102 and the "left" contactor 104 from the voltage bus 100. The opening of contacts 120 therefore causes the "in" and "left" windings of the feed and traverse motors to be instantly deenergized.

In order to cause the tool 15 to back away from the work as soon as the emergency stop button is pressed, contacts 119 of the emergency stop relay 116 are wired to provide an auxiliary path for energizing the "out" contactor 105 from the voltage bus 100 via the normally closed contacts g' of control relay g. Then, after the tool has moved out to position "g," relay devices G and g are automatically operated thereby opening the contacts g' and closing the contacts g''. Closure of the latter contacts causes the "right" contactor 106 to pick up thereby causing the traverse motor to drive the tool back to its initial position "h" illustrated in Fig. 1. Upon reaching the latter position, relay devices H and h are actuated, automatically opening contacts h', deenergizing the "right" contactor 106, and causing the tool to come to rest.

It will be apparent from the foregoing that the emergency stop feature of the control circuit enables the tool to be immediately withdrawn from the workpiece at any point in the cycle of machining operations. It is also important to note that the system as a whole is "failsafe" that is, there is no possibility of damaging the machine tool or the workpiece if, for any reason whatsoever, power should suddenly fail, causing all of the electromagnetic relays contained in the receiving devices A to H to drop out (and the control relays a to h to pull in) simultaneously. As previously stated, each of the control relays contains normally closed interlock contacts which are effective to disable the contactors controlling performance of the preceding function. Thus, none of the relays is effective to energize any of the contactors, the final control relay h serving to open the contacts h' and thus to deenergize even the "right" contactor 106.

If it is desired to initiate a succeeding cycle of operations it becomes necessary, of course, to deenergize the emergency stop relay 116. For this purpose an auxiliary set of contacts 121 is employed which, upon the pressing of the start push button 112, open the sealing circuit of the relay 116 allowing it to drop out.

Relay resetting circuit

In the preferred form of the invention, as covered above, the electromagnetic relays 76 in the receiving devices A to H are caused to drop out as the frequency applied thereto reaches the critical value for which the particular receiving device has been adjusted. It has further been stated that each of such devices includes a limiter 88 for preventing the associated electromagnetic relay from again picking up as the critical value of frequency is passed. Some means must be provided therefore for picking up the relays 76 and thus restoring them to their initial condition after the entire cycle of machining operations has been completed and preparatory to initiating a succeeding cycle.

In accordance with one of the aspects of the invention, tripping of the final one of the electromagnetic relays 76 in the series is caused to pick up the remainder of such relays by applying a voltage pulse to an associated control grid. This is accomplished in the present instance by using a "flip-flop" circuit indicated generally at 126 (see Fig. 3). Such circuit per se is of a well known type in which there are two conditions of stable operation, transfer from one of the stable conditions to the other being effected by applying to the circuit a positive voltage pulse of short duration. Inspecting the "flip-flop" circuit in detail, it will be noted that external connections include two input terminals 128, 129 and two output terminals 130, 131.

Internally, triodes 132, 134 are used having cathodes which are tied together and grounded and having series resistors 135, 136 in the respective plate circuits. The grids of the triodes 132, 134 are grounded through grid resistors 138, 139 respectively, while the grids and plates are cross-connected by means of resistors 140, 141. The positive voltage pulses necessary to reverse the condition of stability are applied through grid input capacitors 142, 144 respectively.

Upon examination of the lower righthand portion of Fig. 3, it will be seen that the triggering pulse for the "flip-flop" circuit is derived from the high potential source 69, and is applied to the triggering output terminal 146 as a result of closure of contacts 85 associated with the electromagnetic relay 76.

Each of the receiving devices A through H is in addition provided with a triggering input terminal 148 which is coupled to the grid 75a of the output valve by means of a coupling capacitor 149. Upon application of a large positive pulse of voltage to the terminal 148, the grid 75a coupled thereto is caused to swing highly positive, resulting in a sudden surge of current through the load circuit of the output valve 75. It is to be noted that such resetting pulse is not limited in amplitude by the limiter 88 in the manner of an ordinary signal but is fed into the circuit at a point which is completely independent of the limiting action. Once the electromagnetic relay 76 is restored to its picked up condition it will remain picked up until a signal of the critical frequency is next applied to the input terminals.

The operation of the "flip-flop" circuit in resetting the frequency responsive relay devices will be clearly seen by assuming that the triode 132 is in a highly conductive state while the triode 134 is non-conductive. Dropping out of the electromagnetic relay 76 is effective to apply a positive pulse to the grid of the triode 134, and, because of the resulting voltage drop through the plate series resistor 136, causes the voltage at the plate of the triode 134 to swing negatively. Also, due to the coupling effect of the cross-connected resistor 141, the grid of the remaining triode 132 is caused to swing in a negative direction thereby reducing the flow of plate current in the latter. As a result, the voltage at the plate of triode 132 swings positively, which tendency is transmitted to the grid of the triode 134 through the cross-connected coupling resistor 140. The latter further increases the current flow in the plate circuit of the triode 134, and the process is repeated until the latter triode conducts heavily while the remaining triode 132 is non-conductive. The reversal takes place very rapidly, and the resulting effect is to produce a large positive pulse of voltage at the output terminal 131 which is conveyed to the resetting terminals 148 of the frequency responsive relay devices A to G causing them to pull up.

Although the frequency responsive relay H is thus effective to reset all of the remaining frequency responsive relays, it is not of itself reset until a later point in the operating cycle. The latter is necessary in order to give the relay H sufficient time to complete its function before resetting. In the practice of the invention frequency responsive relay H is reset as an incident to the tripping of relay A, which is the first relay in the series A—H to be operated during the course of a succeeding cycle of machining operations. Operation of the "flip-flop" circuit 126 in the reverse sense to reset relay H occurs in a manner completely analogous to that already described. Upon tripping of relay A a positive pulse is applied to the output terminal 146 thereof which, acting through the coupling capacitor 142, causes the grid of the triode 132 to swing positively. As a result triode 132 becomes conductive while the companion triode 134 becomes non-conductive causing a positive pulse to appear at the output terminal 130 of the "flip-flop" circuit. Such positive pulse applied to the grid 75a of the output valve 75 causes the electromagnetic relay 76 to pick up in readiness for dropping out as its critical frequency is reached later in the operating cycle.

*Summary of operation*

While the operation of the control system as a whole will be understood from the foregoing discussion, it will be helpful to summarize it briefly. At the outset, it will be assumed that each of the frequency responsive relay devices A to H is adjusted to respond, in other words to drop out, at some critical frequency corresponding to a predetermined position of the associated variable capacitor 25 or 26. Thus, frequency responsive relay A (for example) should be adjusted to operate automatically as an incident to the movement of the tool 15 inwardly to position "a" (see Fig. 1). The resulting operation of the motor control relay a will then complete a circuit through contacts a", b', energizing the "left" contactor 104 and automatically starting the tool moving to the left. Such leftward movement continues until the tool reaches position "b." At this point frequency responsive relay B, if it has been properly adjusted to respond to the then existing frequency, will trip, causing the tool automatically to move outwardly to position "c." Subsequent movements will take place in the same general manner until the tool completes a predetermined program of feeding and traversing movements, resulting in the removal of the stock indicated by the dotted outline 16a.

For the purpose of ready understanding the operations occurring at each of the positions "a" to "h" have been summarized in the following table:

| Tool Movement | Capacitor being Varied | Receiving Device Responsive | Control Relay Energized | Control Relay Deenergized | Contactor Energized |
|---|---|---|---|---|---|
| Start | | | | | "In." |
| To "a" | 25 | ¹A | a | | "Left." |
| To "b" | 26 | B | b | a | "Out." |
| To "c" | 25 | C | c | b | "Left." |
| To "d" | 26 | D | d | c | "Out." |
| To "e" | 25 | E | e | d | "Left." |
| To "f" | 26 | F | f | e | "Out." |
| To "g" | 25 | G | g | f | "Right." |
| To "h" | 26 | ²H | h | g | None. |

¹ Resets relay H.
² Resets relays A–G.

As set forth in the above table the capacitors 25, 26 are varied alternately by movement of the cutting tool. The latter results in one after another of the frequency responsive relays being tripped, thereby effecting closure of one after another of the motor control relays a to h. The latter, as we have seen, causes the contactors 102, 104, 105 and 106 to be operated in a predetermined order so that the workpiece 16 is machined accurately to the contour desired.

It is to be particularly noted that no contouring template is required and that the points of response (change in tool direction) may be varied by merely readjusting the ganged resistors 69, 61 in each of the receiving devices. If desired the control knob used for setting purposes may be provided with a vernier and accurately calibrated so that the system may be adjusted for a successive cut or complete change in setup in a few minutes' time.

It will be apparent to one skilled in the art that the teachings disclosed herein are readily applicable to more complicated arrangements without departing from the invention. It has been found, for example, that the available frequency range permits workpieces to be machined which are much larger than here illustrated. Also, since each receiving device draws a negligible amount of power from the transmitting oscillator, there is no practical limit to the number of receiving devices which may be employed. Thus a machine tool of the general type shown may be used in the quantity production of extremely complicated shapes which would be impossible to produce with prior art control linkages.

For the sake of ready understanding operation of the control system has been described in connection with radial and axial movement of the cutting tool. It will be apparent, without departing from our teachings, that the feed and traverse motors could be energized for simultaneous rotation at predetermined relative rates to produce angular movement of the tool with respect to the axis of the work.

In claims appended hereto the expression "a network . . . having the response characteristic of a Wien bridge" is defined as a network whose response characteristic manifests a sharp notch or null point at a particular critical frequency.

We claim as our invention:

1. In a device responsive to the positioning of a movable machine member, the combination comprising a capacitance tuning element operatively associated with said machine member so as to be variable in unison therewith as the latter is advanced along its path of movement, a variable frequency oscillator including said tuning element in its circuit and having an output frequency which varies substantially proportionally with the displacement of the tuning element, and frequency responsive receiving means for the output of the oscillator including an RC network and an amplifier for amplifying the output of said network together with means energized by the amplifier and responsive to a predetermined output voltage thereof upon the arrival of the machine member at a predetermined point in its path of movement.

2. A device responsive to the positioning of a movable machine member comprising, in combination, a tuning element operatively associated with said machine member so as to be variable gradually as said machine member is advanced along its path of movement, a variable frequency oscillator including said tuning element in its circuit and having an output frequency which varies with the positioning of the tuning element, a receiving network coupled to the output of said oscillator and having a response characteristic of a Wien bridge, an amplifier for amplifying the output of said network, and a load device energized by said amplifier and arranged to be actuated upon the decrease in magnitude of the amplifier output signal incident to the arrival of the machine member at a predetermined point along its path of movement.

3. In a device responsive to the positioning of a movable machine member, the combination comprising a tuning element operatively associated with said machine member so as to be variable in unison therewith as the latter is advanced along its path of movement, a variable frequency oscillator including said tuning element in its circuit and having an output frequency which varies with the positioning of the latter, a frequency responsive receiving network, an amplifier for amplifying the output of said network, and means energized by said amplifier and responsive to a predetermined output condition thereof upon the arrival of the machine member at a predetermined point in its path of movement.

4. In a device responsive to the positioning of a movable machine member, the combination comprising a tuning element operatively associated with said machine member so as to be variable gradually as said machine member is advanced along its path of movement, a variable frequency oscillator including said tuning element in its circuit and having an output frequency which varies with the positioning of the latter, a receiving network coupled to the output of said oscillator and adjustable to produce a minimum output signal at a predetermined frequency, an amplifier for amplifying the output of said network, and means energized by said amplifier and responsive to a minimum output signal thereof upon the arrival of the machine member at a predetermined point in its path of movement.

5. In a device of the general type described, the combination comprising a displaceable element, a variable frequency oscillator operatively associated with said displaceable element and so constructed as to produce an output signal of a frequency which is a function of the positioning of said displaceable element along its path of movement, a frequency sensitive network coupled to said oscillator and having the response characteristic of a Wien bridge, an amplifier for amplifying the output of said network, a rectifier for rectifying the signal produced by said amplifier and means including a valve having a grid excited by the output of said rectifier and having a load device in its plate circuit arranged to be actuated upon the reduction in amplifier output incident to said displaceable element reaching a predetermined position.

6. In a device of the general type described, the combination comprising a displaceable element, a variable frequency oscillator operatively associated with said element for producing an output signal whose frequency is a function of the positioning of said displaceable element, a frequency sensitive network coupled to said oscillator and having the notched frequency response characteristic of a Wien bridge, an amplifier excited by the output of said network, an output valve having an input circuit coupled to said amplifier and having an output circuit including an electromagnetic relay, and a signal limiter interposed between said amplifier and said output valve, said limiter being adjustable so that the current allowed to flow through the electromagnetic relay is sufficient to prevent the relay from dropping out except at the notch frequency but is insufficient to cause pull-up of the relay after the same has dropped out as a result of said displaceable element reaching a first predetermined position corresponding to the notch frequency.

7. In a device responsive to the positioning of a movable machine member, the combination comprising a tuning element operatively associated with said machine member so as to be variable gradually as said machine member is advanced along its path of movement, a variable frequency oscillator associated with said tuning element and having an output frequency which varies with the positioning of the latter, a frequency responsive receiving network coupled to said oscillator and having the notched frequency response characteristic of a Wien bridge, an amplifier excited by the output of said bridge, an output valve having an input circuit coupled to said amplifier and having an output circuit including an electromagnetic relay, a signal limiter interposed between said amplifier and said output valve, said limiter being so adjusted that the current through the electromagnetic relay is sufficient to prevent the relay from dropping out except at the notch frequency but is less than the current required for pull-up of the relay after the same has dropped out as a result of said machine member being advanced to a first predetermined position corresponding to the notch frequency, and means for applying a positive pulse directly to the input circuit of the output valve as an incident to said machine member reaching a second predetermined position upon subsequent advancement thereof.

8. In a device for registering a selected one of a predetermined series of frequencies, the combination comprising a source of signal voltage having an adjustable frequency, an RC network connected thereto and arranged to produce a sharply reduced output signal at a selected frequency, an amplifier having an input circuit excited by said network and having an output circuit, means included in said output circuit for rectifying the output signal, a signal limiter for maintaining the rectified signal below a predetermined level, an output valve having a grid excitingly coupled to said rectifier and having a plate circuit including an electromagnetic relay, said signal limiter being effective to limit the normal current in said relay to a value which is less than the pick-up value but greater than the drop-out value so that said relay remains picked up only until such time as the input signal is at said selected frequency, and means for applying a positive pulse to the grid of said output valve for restoring said relay to its picked up condition.

9. In a device responsive to the arrival of a movable machine member at individual ones of a series of predetermined positions, the combination comprising a tuning element operatively associated with said machine member so as to be variable in unison with said machine member as the latter is advanced along its path of movement, a variable frequency oscillator controlled by said tuning element, a plurality of frequency responsive RC networks coupled to the output of said oscillator and adapted to produce sharply reduced output voltages respectively at frequencies corresponding to said predetermined positions, means including electromagnetic relays respectively energized by said networks and arranged to drop out as an incident to said oscillator frequency reaching the value to which the associated network is responsive and to remain dropped out upon departure of the oscillator frequency from the respective predetermined value, a series of controlled devices associated with respective ones of said electromagnetic relays and arranged to be operated in a predetermined sequence as said machine member is advanced in its path of movement, and means operated as an incident to said member's reaching the end of the cycle of movement for restoring said relays to the picked-up condition in readiness for a succeeding cycle.

10. In a sequential control device, the combination comprising a movable control member, a variable frequency oscillator for producing a signal having a frequency varied in accordance with the positioning of said control member, first and second frequency responsive devices, each of said devices having an RC network coupled to the output of said oscillator and adjustable to produce a minimum output voltage at respective pre-selected frequencies, valves having grid circuits respectively excited by said network and having electromagnetic relays included in the plate circuits thereof arranged to be dropped out upon the reaching of the respective pre-selected frequency, means respectively interposed between said networks and said valves for limiting the maximum currents in said relays to below the pull-up value, a flip-flop circuit having a pair of input terminals and a pair of output terminals, means under the control of respective ones of said electromagnetic relays for applying positive potential to said input terminals, and means coupling said output terminals to said grid circuits respectively so that a positive pulse of voltage is applied to individual ones of said grid circuits upon dropping out of the opposite one of said electromagnetic relays.

11. In a control device the combination comprising a movable control member, a variable frequency oscillator including a tuning element operatively associated with said control member so as to produce an output signal which is a function of the positioning of said control member, a series of frequency responsive devices coupled to the output of said oscillator and including means for adjusting the respective devices for response to different frequencies, relays actuated by respective ones of said frequency responsive devices as said movable control member is advanced in its path of movement, means energized by said relays respectively for initiating a series of desired functions, and interlock means for insuring that said functions are initiated only in predetermined sequence.

12. In a device for initiating a series of switch controlled operations, the combination comprising an oscillator having a movable tuning element for controlling the frequency of the output signal thereof, a series of frequency responsive devices including networks adjusted to respond to respective incremental values of oscillator frequency, valves having input circuits respectively coupled to said networks and having electromagnetic switches controlled by the respective output circuits thereof, the attainment of predetermined oscillator frequencies being effective to operate respective ones of said switches, an electrical interlock associated with each of said electromagnetic switches for controlling application of power to switches to be subsequently actuated thereby to insure that said operations are initiated in predetermined sequence as said oscillator is varied by said tuning element through its frequency range, and means actuated simultaneously with the final switch in the series for restoring the remaining switches to a condition of readiness for a subsequent operating cycle.

13. In a device responsive to the positioning of a movable machine member, the combination comprising a variable frequency oscillator including a Wien bridge and means excited by said Wien bridge for producing an output signal of a frequency corresponding to the balance frequency of said bridge, means operatively associated with said machine member for adjusting the capacitors in adjacent legs of said Wien bridge in unison with the positioning of said machine member to vary the output frequency of said oscillator, and a receiving device responsive to said output frequency upon the attainment of a predetermined position of said machine member.

14. In a device responsive to the positioning of a movable machine member, the combination comprising a variable frequency generator including a first Wien bridge having a tuning element adapted to be coupled to said machine member, and means controlled by the output of said Wien bridge for producing an output signal of a frequency corresponding to the balance frequency thereof, a second Wien bridge excited by the output signal of said generator and having a range of adjustment substantially corresponding to said first bridge, and means responsive to a condition of balance in said second bridge corresponding to a predetermined condition of adjustment of said first bridge.

15. In a device responsive to the positioning of a movable machine member, the combination comprising a capacitor having first and second relatively movable portions adapted to be relatively moved in unison with said movable machine member, said first portion including a common electrode and said second portion including a pair of electrodes each in capacitive relation to said common electrode, a Wien bridge having the electrodes of said pair respectively connected in adjacent legs of said bridge to adjust the balance point thereof, means responsive to the condition of adjustment of said bridge for generating a signal at the balance frequency, and means coupled to the output of said signal generating means including a second Wien bridge operatively responsive to the signal of said signal generating means upon the arrival of said machine member at a predetermined point in its path of movement.

16. In a device responsive to the positioning of a movable machine member, a two-section capacitor adapted to be mechanically coupled to said machine member and having a pair of relatively stationary tubular electrodes and a relatively movable common electrode telescopingly inserted between them, a Wien bridge including the sections of said capacitor in its adjacent legs respectively to adjust the balance point of the bridge in unison with the movement of said machine member, means responsive to the condition of adjustment of said Wien bridge for generating a signal at the balance frequency, and means including a bridge circuit responsive to the frequency of said signal generated upon the arrival of said machine member at a predetermined point in its path of movement.

GEORGE A. WALDIE.
HOWARD F. MacMILLIN.

REFERENCES CITED

The following references are of record in the file of this patent:

UNITED STATES PATENTS

| Number | Name | Date |
|---|---|---|
| 1,078,106 | Miller | Nov. 11, 1913 |
| 1,431,638 | Dowling | Oct. 10, 1922 |
| 1,635,779 | Carter | July 12, 1927 |
| 1,733,045 | Baker | Oct. 22, 1929 |
| 1,838,084 | Drake | Dec. 29, 1931 |
| 1,838,961 | Robinson | Dec. 29, 1931 |
| 1,875,329 | Chirex | Sept. 6, 1932 |
| 1,944,988 | Lum | Jan. 30, 1934 |
| 1,951,454 | Tiefenbacher | Mar. 20, 1934 |
| 2,025,748 | Howe | Dec. 31, 1935 |
| 2,032,598 | Shaw | Mar. 3, 1936 |
| 2,116,593 | Bouvier | May 10, 1938 |
| 2,118,424 | Watanabee | May 24, 1938 |
| 2,168,198 | Frink | Aug. 1, 1939 |
| 2,194,559 | Koch | Mar. 26, 1940 |
| 2,228,163 | Cohen | Jan. 7, 1941 |
| 2,325,927 | Wilbur | Aug. 3, 1943 |
| 2,368,953 | Walsh | Feb. 6, 1945 |
| 2,410,295 | Kuelini | Oct. 29, 1946 |
| 2,423,229 | Crosby | July 1, 1947 |
| 2,433,599 | Cohen | Dec. 30, 1947 |
| 2,438,017 | Murcek | Mar. 16, 1948 |
| 2,446,390 | Rath | Aug. 3, 1948 |
| 2,451,014 | Zworkin | Oct. 12, 1948 |
| 2,516,324 | Joy | July 25, 1950 |